US012716534B2

(12) United States Patent
Qiu

(10) Patent No.: US 12,716,534 B2
(45) **Date of Patent: *Aug. 25, 2026**

(54) JOINT ASSEMBLY AND FAUCET

(71) Applicant: WENZHOU FURUISI BUILDING MATERIALS CO., LTD., Wenzhou (CN)

(72) Inventor: Chunhe Qiu, Wenzhou (CN)

(73) Assignee: WENZHOU FURUISI BUILDING MATERIALS CO., LTD., Wenzhou (CN)

( * ) Notice: Subject to any disclaimer, the term of this patent is extended or adjusted under 35 U.S.C. 154(b) by 0 days.

This patent is subject to a terminal disclaimer.

(21) Appl. No.: 19/179,653

(22) Filed: Apr. 15, 2025

(65) Prior Publication Data

US 2026/0160366 A1 Jun. 11, 2026

Related U.S. Application Data

(63) Continuation of application No. 19/005,516, filed on Dec. 30, 2024, now Pat. No. 12,435,822.

(30) Foreign Application Priority Data

Nov. 8, 2024 (CN) ........................ 202422730913.0

(51) Int. Cl.
*F16L 37/098* (2006.01)
*F16L 37/084* (2006.01)

(52) U.S. Cl.
CPC ....... *F16L 37/0985* (2013.01); *F16L 37/0982* (2013.01); *F16L 37/0847* (2013.01)

(58) Field of Classification Search
CPC ............... F16L 37/0847; F16L 37/0887; F16L 37/0915; F16L 37/098; F16L 37/0982; F16L 37/0985
See application file for complete search history.

(56) References Cited

U.S. PATENT DOCUMENTS 4,966,398 A * 10/1990 Peterson ............. F16L 37/0982
6,467,816 B1 * 10/2002 Huang ................ F16L 37/0985
7,976,071 B2 * 7/2011 Bibby ................. F16L 37/0985
9,599,267 B2 * 3/2017 Dude .................. F16L 37/0982
2005/0221679 A1 * 10/2005 Takayanagi ......... F16L 37/0985

(Continued)

*Primary Examiner* — William S. Choi

(74) *Attorney, Agent, or Firm* — HOWARD M COHN and Associates, LLC

(57) ABSTRACT

A joint assembly and a faucet include a first coupling portion and a second coupling portion. A first connecting structure and a first guide structure are disposed on the first coupling portion. A connecting structure and a second guide structure are disposed on the second coupling portion. The second coupling portion and the first coupling portion are sleeved with each other. The first guide structure and the second guide structure cooperate with each other to limit a movement direction of the first coupling portion and a movement direction of the second coupling portion in a sleeving process, so that the first connecting structure is aligned with the second connecting structure; The first connecting structure and the second connecting structure cooperate with each other to position the first coupling portion and the second coupling portion after the second coupling portion and the first coupling portion are sleeved with each other.

16 Claims, 9 Drawing Sheets

(56) References Cited

U.S. PATENT DOCUMENTS

2008/0036206 A1* 2/2008 Li-guo ................ F16L 37/0985
2012/0080880 A1* 4/2012 Nakamura .......... F16L 37/0982
2019/0024834 A1* 1/2019 Mao ................... F16L 37/0985

* cited by examiner

JOINT ASSEMBLY AND FAUCET

TECHNICAL FIELD

The present disclosure relates to a field of faucets, and in particular to a joint assembly and a faucet.

BACKGROUND

In the related art, a joint assembly of a faucet is generally connected by screwing. The joint assembly of the faucet comprises an external thread, and one end of a water pipe or a connector connected to the joint assembly comprises an internal thread. The external thread of the joint assembly is aligned with the internal thread of the water pipe or the connector, and then the water pipe or the connector is rotated to enable the external thread being screwed with the internal threads, so that the water pipe or the connector is tightly connected to the faucet. However, during an installation process, an auxiliary tool such as a wrench is required to apply force, which makes an installation of the faucet inconvenient.

In view of this, there are faucet assemblies assembled by a plug-in method and the faucet assemblies adopt a non-threaded structure thereof to connect to the water pipe or the connector. However, the plug-in method requires to artificially align fixing structures of joints of the faucet assemblies in advance, and then an insertion operation is performed. A plug-in process thereof is still time-consuming and causes inconvenience in installation. Moreover, if the fixing structures are not aligned in advance before the insertion operation, subsequent assembly operations are very likely to cause damage to the faucet assemblies and cause losses.

SUMMARY

The present disclosure provides a joint assembly and a faucet, which are convenient to install and avoid damage to components thereof caused by an assembly action.

In the joint assembly and the faucet of the present disclosure, a first guide structure thereof and a second guide structure thereof cooperate with each other to limit a movement direction of a first coupling portion thereof and a movement direction of the second coupling portion thereof, so that the first connecting structure and the second connecting structure are automatically aligned during an assembly process. Therefore, the first connecting structure and the second connecting structure cooperate with each other to fix a position of the first coupling portion relative to the second coupling portion after the first coupling portion and the second coupling portion are sleeved with each other. There is no need for manual alignment, the assembly process is more convenient, and damage to the components caused by not aligning the components in advance is avoided.

BRIEF DESCRIPTION OF DRAWINGS

In order to clearly describe technical solutions in the embodiments of the present disclosure, the following will briefly introduce the drawings that need to be used in the description of the embodiments or the prior art. Apparently, the drawings in the following description are merely some of the embodiments of the present disclosure, and those skilled in the art are able to obtain other drawings according to the drawings without contributing any inventive labor.

For a complete understanding of the present disclosure and its characteristics, the following description is made in conjunction with the accompanying drawings, where same reference numbers in the following description indicate same structures.

DETAILED DESCRIPTION

Technical solutions in the embodiments of the present disclosure will be clearly and completely described below in conjunction with the accompanying drawings in the embodiments of the present disclosure. Obviously, the described embodiments are only a part of the embodiments of the present disclosure, rather than all of the embodiments. The following description of at least one exemplary embodiment is merely illustrative and is in no way intended as any limitation on the present disclosure, applications thereof, and use thereof. Based on the embodiments of the present disclosure, all other embodiments obtained by those of ordinary skill in the art without creative work shall fall within the protection scope of the present disclosure.

Reference herein to “embodiment” or “implement” means that a particular feature, structure, or characteristic described in connection with one embodiment or one implement may be included in at least one embodiment of the present disclosure. The appearances of the “embodiment” in various positions in the specification are not necessarily referring to the same embodiment, and are not independent or alternative embodiments mutually exclusive of other embodiments. Those skilled in the art explicitly and implicitly understand that the embodiments described herein may be combined with other embodiments.

The present disclosure provides a joint assembly of a faucet, which is convenient to install and avoids damage to components thereof caused by an assembly action.

Figure 1:
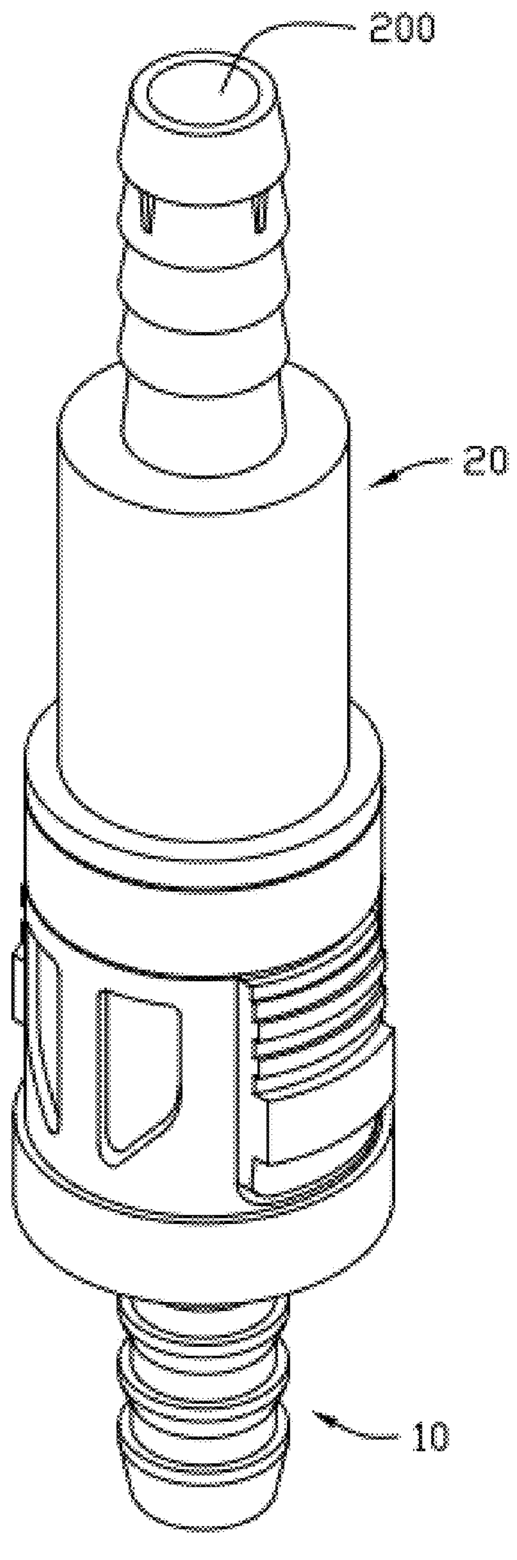
FIG. 1 is a schematic diagram of a joint assembly shown in an assembled state according to one embodiment of the present disclosure.
Figure 2:
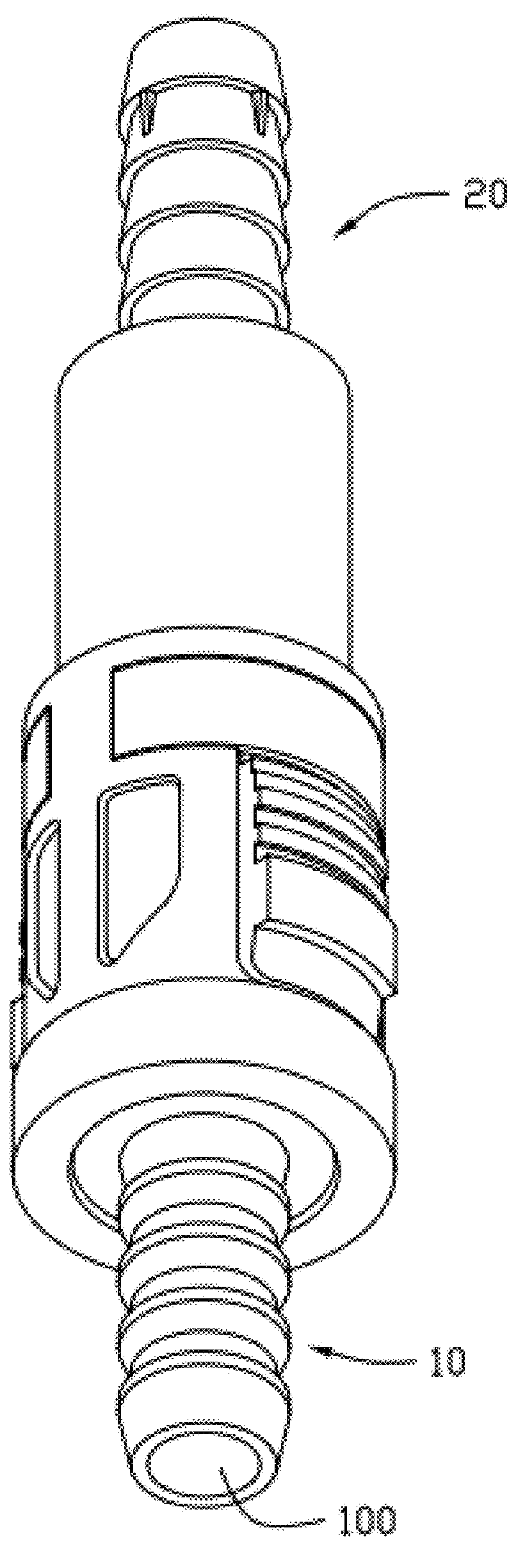
FIG. 2 is another schematic diagram of the joint assembly shown in the assembled state according to one embodiment of the present disclosure.
Figure 3:
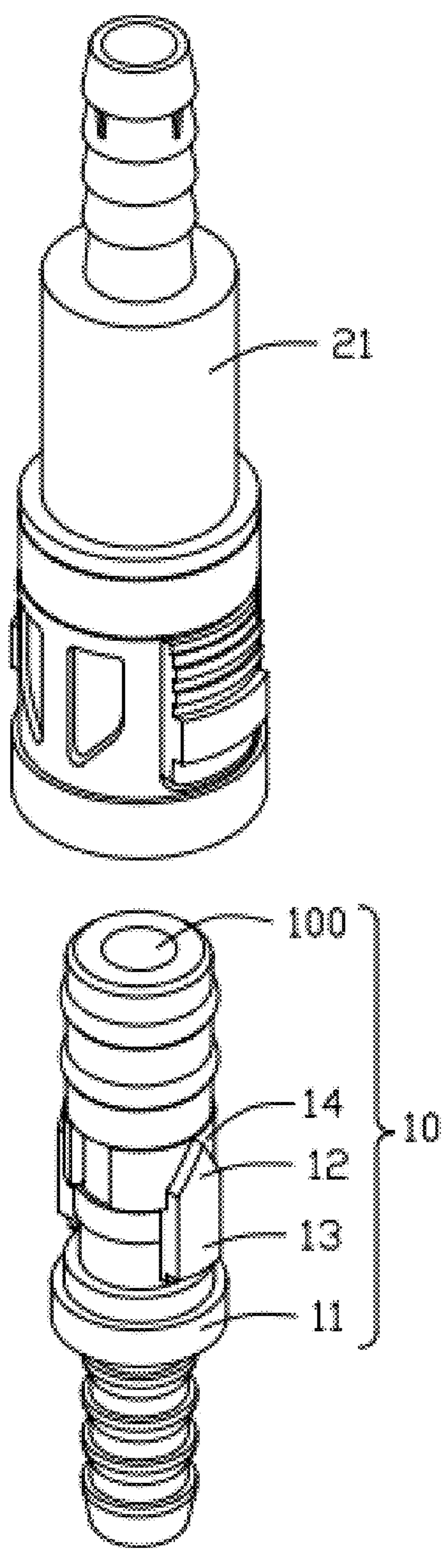
FIG. 3 is a schematic diagram of the joint assembly shown in a separated state according to one embodiment of the present disclosure.
Figure 4:
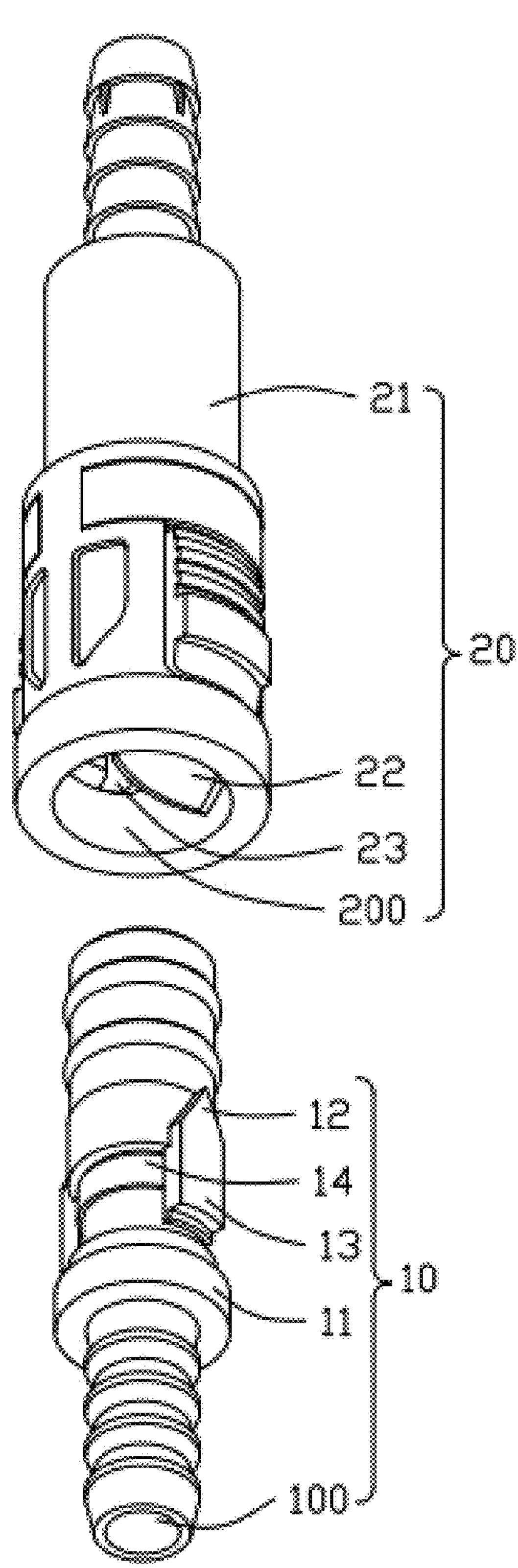
FIG. 4 is another schematic diagram of the joint assembly shown in the separated state according to one embodiment of the present disclosure.

As shown in FIGS. 1-4, the joint assembly comprises a first joint 10 and a second joint 20. A length direction thereof is a direction from top to bottom as shown in FIG. 2.

The first joint 10 defines a first channel 100 penetrating through the first joint 10 in a length direction thereof. The first joint 10 comprises a first coupling portion 11, a first connecting structure 13, and a first guide structure 12. The first connecting structure 13 and the first guide structure 12 are disposed on the first coupling portion 11. The second joint 20 comprises a second channel 200 penetrating through the second joint 20 in a length direction thereof. The second joint 20 comprises a second coupling portion 21, a second connecting structure 23, and a second guide structure 22. The second connecting structure 23 and the second guide structure 22 are disposed on the second coupling portion 21. The second coupling portion 21 is configured to be sleeved on the first coupling portion 11, so that the second coupling portion 21 and the first coupling portion 11 are sleeved with each other. The first guide structure 12 and the second guide structure 22 cooperate with each other to limit a movement direction of the first coupling portion 11 and a movement direction of the second coupling portion 21 in a sleeving process of the second coupling portion 21 and the first coupling portion 11, so that the first connecting structure 13 is aligned with the second connecting structure 23. The first connecting structure 13 and the second connecting structure 23 cooperate with each other to position the first coupling portion 11 and the second coupling portion 21 after the second coupling portion 21 and the first coupling portion 11 are sleeved with each other.

For instance, in one optional embodiment of the present disclosure, the first guide structure 12 and the second guide structure 22 play a guide role to guide the first coupling portion 11 and the second coupling portion 21 to rotate relative to each other, thereby limiting and adjusting the movement direction of the first coupling portion 11 and the movement direction of the second coupling portion 21 during the sleeving process. Therefore, while the first coupling portion 11 and the second coupling portion 21 are approaching each other to be sleeved with each other, the first connecting structure 13 and the second connecting structure 23, which are not aligned in advance, are rotated and aligned with each other. Thus, the first connecting structure 13 and the second connecting structure 23 are easily matched with each other and tightly connected.

In the joint assembly of the present disclosure, the first guide structure and the second guide structure cooperate with each other to limit the movement direction of the first coupling portion and the movement direction of the second coupling portion, so that the first connecting structure and the second connecting structure are automatically aligned during an assembly process. Therefore, the first connecting structure 13 and the second connecting structure 23 cooperate with each other to fix a position of the first coupling portion relative to the second coupling portion after the first coupling portion and the second coupling portion are sleeved with each other. There is no need for manual alignment of the first connecting structure 13 and the second connecting structure 23, the assembly process is more convenient, and damage to the components caused by not aligning the first connecting structure 13 and the second connecting structure 23 in advance are avoided.

As shown in FIGS. 5-9, in one optional embodiment, the first guide structure 12 comprises at least two guide pieces 120. The at least two guide pieces 120 are disposed around the first joint 10 in the length direction of the first joint 10, and the at least two guide pieces 120 are spaced apart from each other and are disposed on an outer wall of the first coupling portion 11. The second guide structure 22 comprises at least two guide plates 220. The at least two guide plates 220 are disposed around the second joint 20 in the length direction of the second joint 20. The at least two guide plates 220 are spaced apart from each other and are disposed on an inner wall 210 of the second coupling portion 21. A guide groove 2200 is defined between each two adjacent guide plates 220 of the at least two guide plates 220, and each guide groove 2200 is corresponding to a corresponding one of the at least two guide pieces 120. When the second coupling portion 21 is sleeved on the first coupling portion 11, each of the guide pieces 120 is accommodated in a corresponding guide groove 2200 and is slidable in the corresponding guide groove 2200.

Specifically, each of the guide pieces 120 comprises two first guide walls 121. The two first guide walls 121 of each of the guide pieces 120 intersect at one end of each of the guide pieces 120 to form a first guide tip 122 of each of the guide pieces 120. Each of the guide plates 220 comprises two second guide walls 221. The two second guide walls 221 of each of the guide plates 220 intersect at one end of each of the guide plates 220 to form a second guide tip 222 of each of the guide plates 220. When the second coupling portion 21 is sleeved on the first coupling portion 11, each first guide tip 122 faces the second coupling portion 21, each second guide tip 222 faces the first coupling portion 11, and the two first guide walls 121 of each of the guide pieces 120 are disposed in the corresponding guide groove 2200 and are slidable relative to at least one of two adjacent guide plates. When the first guide walls 121 slide along the second guide walls 221, the second coupling portion 21 rotates relative to the first coupling portion 11. Therefore, under the cooperation of the first guide structure 12 and the second guide structure 22, the first connecting structure 13 is aligned with the second connecting structure 23 during the sleeving process, so as to facilitate cooperation and fixation of the first connecting structure 13 and the second connecting structure 23.

Optionally, in one embodiment, the two first guide walls 121 and the first guide tip 122 in each of the guide pieces 120 form a first isosceles triangle-shaped vertex structure. That is, the two first guide walls 121 of each of the guide pieces 120 have the same length, opposite inclination directions, but the same inclination angles, thereby forming a bilaterally symmetrical structure in a circumferential direction of the first coupling portion 11. Similarly, the two second guide walls 221 and the second guide tip 222 in each of the guide plates 220 form a second isosceles triangle-shaped vertex structure. That is, the two second guide walls 221 of each of the guide plates 220 have the same length, opposite inclination directions, but the same inclination angles, thereby forming a bilaterally symmetrical structure in a circumferential direction of the second coupling portion 21. By such configuration, a structural processing is more convenient, and the first guide walls 121 are enabled to produce same force effect and same movement limiting effect when cooperating with the second guide walls 221 of different guide plates, ensuring that the same alignment effect is produced when the first coupling portion 11 and the second coupling portion 21 are sleeved from different angles.

It is understood that in other embodiments of the present disclosure, each first guide tip 122 and each second guide tip 222 may be arc surfaces. When each first guide tip 122 abuts against a corresponding second guide tip 222, the two first guide walls 121 thereof and the two second guide walls 221 thereof on two sides of the arc surfaces are inclined, so that the two first guide walls 121 thereof slide along the two second guide walls 221 thereof. Therefore, the second coupling portion 21 and the first coupling portion 11 rotate relative to each other during the sliding of the first guide walls 121 along the second guide walls 221. With the cooperation of the first guide structure 12 and the second guide structure 22, the first connecting structure 13 is aligned with the second connecting structure 23 during the sleeving process, so as to facilitate the cooperation and fixation of the first connecting structure 13 and the second connecting structure 23.

In addition, the first guide structure 12 and the first connecting structure 13 may be manufactured separately and then assembled and fixed into a whole, or the first guide structure 12 and the first connecting structure 13 are directly manufactured into a whole. Specifically, in the embodiment of the present disclosure, the first guide structure 12 and the first connecting structure 13 are manufactured into a whole, that is, the first guide structure 12 and the first connecting structure 13 are integrally disposed.

In one optional embodiment, the first guide structure 12 is connected to the first connecting structure 13, and the first guide structure 12 and the first connecting structure 13 are rotatable on an outer wall of the first coupling portion 11. In this way, when an installation space is limited or maintenance is required, the first guide structure 12, the first connecting structure 13, and the first coupling portion 11 that are connected to the second coupling portion 21 are rotatable relative to the second coupling portion 21, making it more convenient for an operator to operate the joint assembly. Further, since the first joint is rotatable relative to the second joint, stress on connection parts thereof caused by water flow impact or external force is reduced, thereby extending service life of the joint assembly.

Furthermore, in one embodiment, the first joint 10 further comprises a first rotating structure 14. The first rotating structure 14 is disposed on the outer wall of the first coupling portion 11, and the first rotating structure 14 is rotatable on the outer wall of the first coupling portion 11. The first guide structure 12 and the first connecting structure 13 are disposed on the first rotating structure 14, and the first guide structure 12 is closer to a free end of the first coupling portion 11 than the first connecting structure 13. Furthermore, the first rotating structure 14 is a first sleeving ring sleeved on the outer wall of the first coupling portion 11. The first connecting structure 13 extends from the first sleeving ring toward the second coupling portion 21. The first guide structure 12 extends from one end of the first connecting structure 13 toward the second coupling portion 21.

The first guide structure 12, the first connecting structure 13, and the first rotating structure 14 may be manufactured separately and then assembled and fixed into a whole, or the first guide structure 12, the first connecting structure 13, and the first rotating structure 14 may be directly manufactured into a whole. In one embodiment, the first guide structure 12, the first connecting structure 13, and the first rotating structure 14 are integrally disposed. That is, the first guide structure 12, the first connecting structure 13, and the first rotating structure 14 are directly manufactured into a whole.

The first rotating structure 14 is a first O-shaped ring or a first C-shaped ring. When the first rotating structure 14 is the first C-shaped ring, the first rotating structure 14 is deformable under external forces to make an opening thereof larger, so that it is convenient for the operator to remove the first rotating structure 14 from the first coupling portion 11. In this way, when the first guide structure 12 and/or the first connecting structure 13 is damaged, the first rotating structure 14 is allowed to be removed and replaced, and an operation process is simple and quick.

It should be noted that in one optional embodiment of the present disclosure, one of the first connecting structure 13 and the second connecting structure 23 comprises coupling portions, the other one of the first connecting structure 13 and the second connecting structure 23 comprises clamping holes or clamping grooves, and the clamping holes or the clamping grooves are respectively configured to accommodate the coupling portions to position the first coupling portion 11 relative to the second coupling portion 21 after the first coupling portion 11 is sleeved on the second coupling portion 21.

Figure 5:
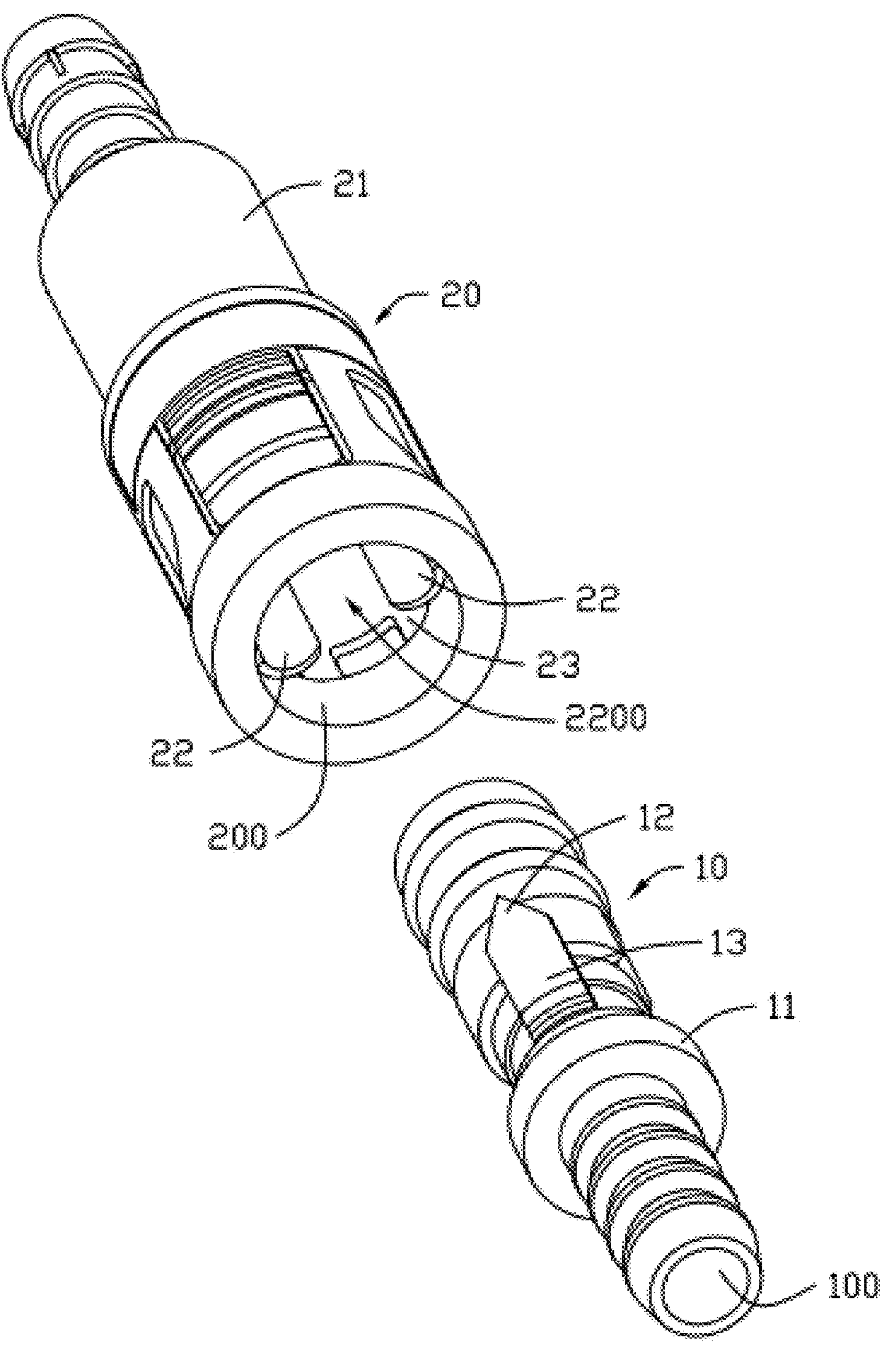
FIG. 5 is another schematic diagram of the joint assembly shown in the separated state according to one embodiment of the present disclosure.
Figure 6:
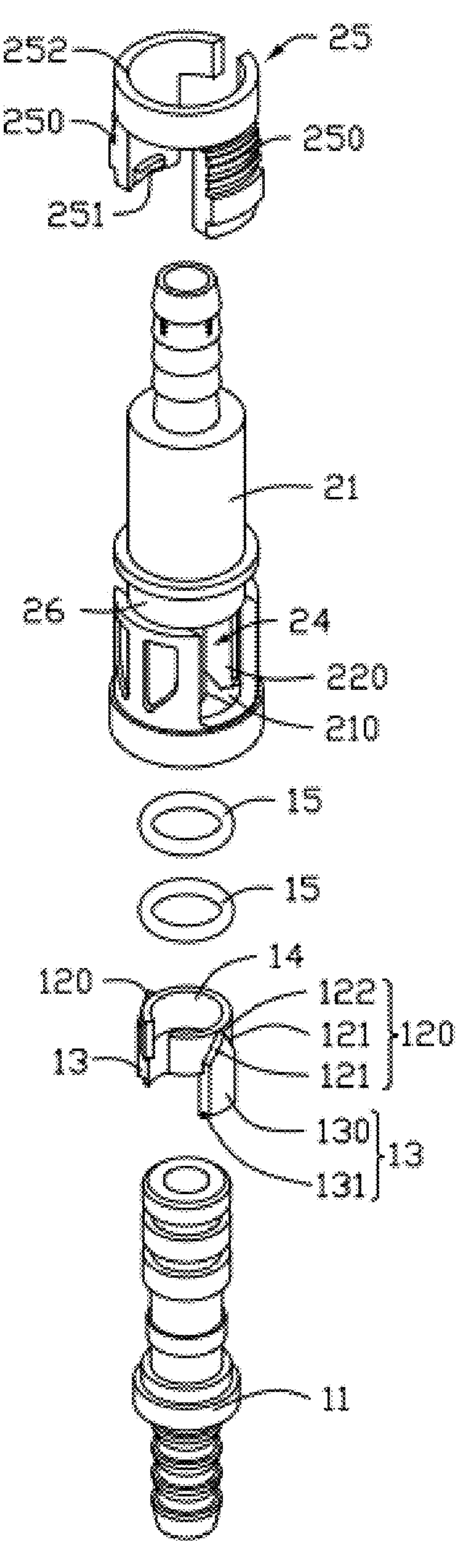
FIG. 6 is an exploded schematic diagram of the joint assembly according to one embodiment of the present disclosure.
Figure 7:
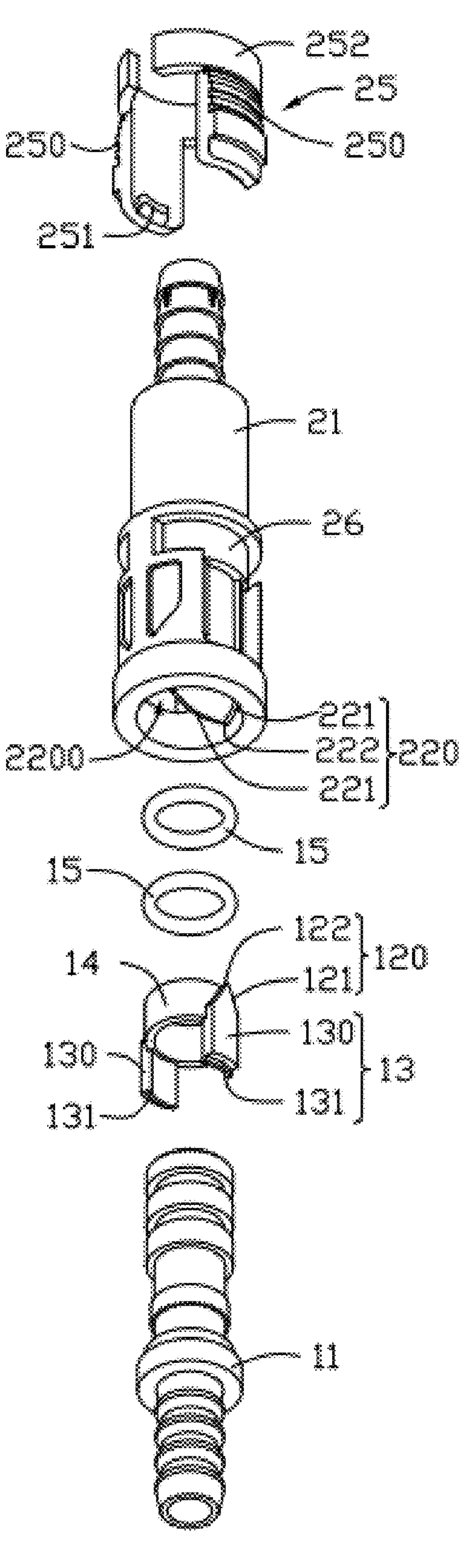
FIG. 7 is another exploded schematic diagram of the joint assembly according to one embodiment of the present disclosure.
Figure 8:
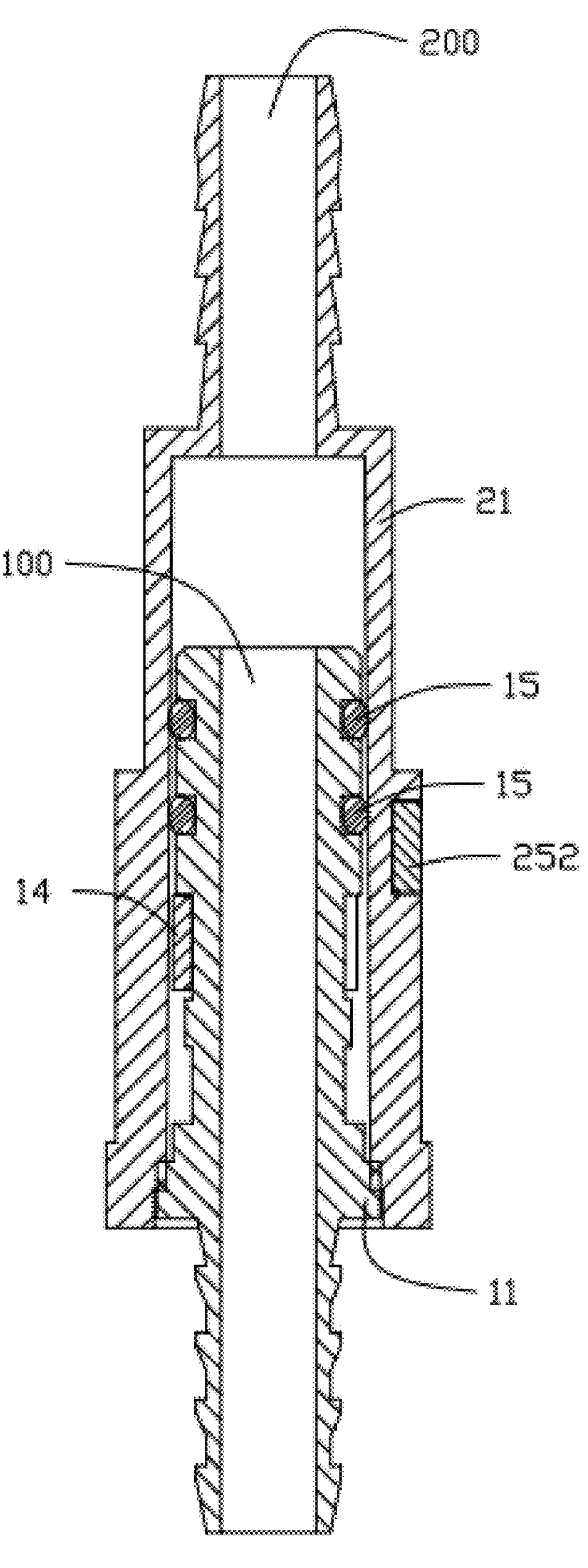
FIG. 8 is a cross-sectional schematic diagram of the joint assembly according to one embodiment of the present disclosure.
Figure 9:
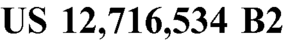
FIG. 9 is another cross-sectional schematic diagram of the joint assembly according to one embodiment of the present disclosure.
Figure 9:
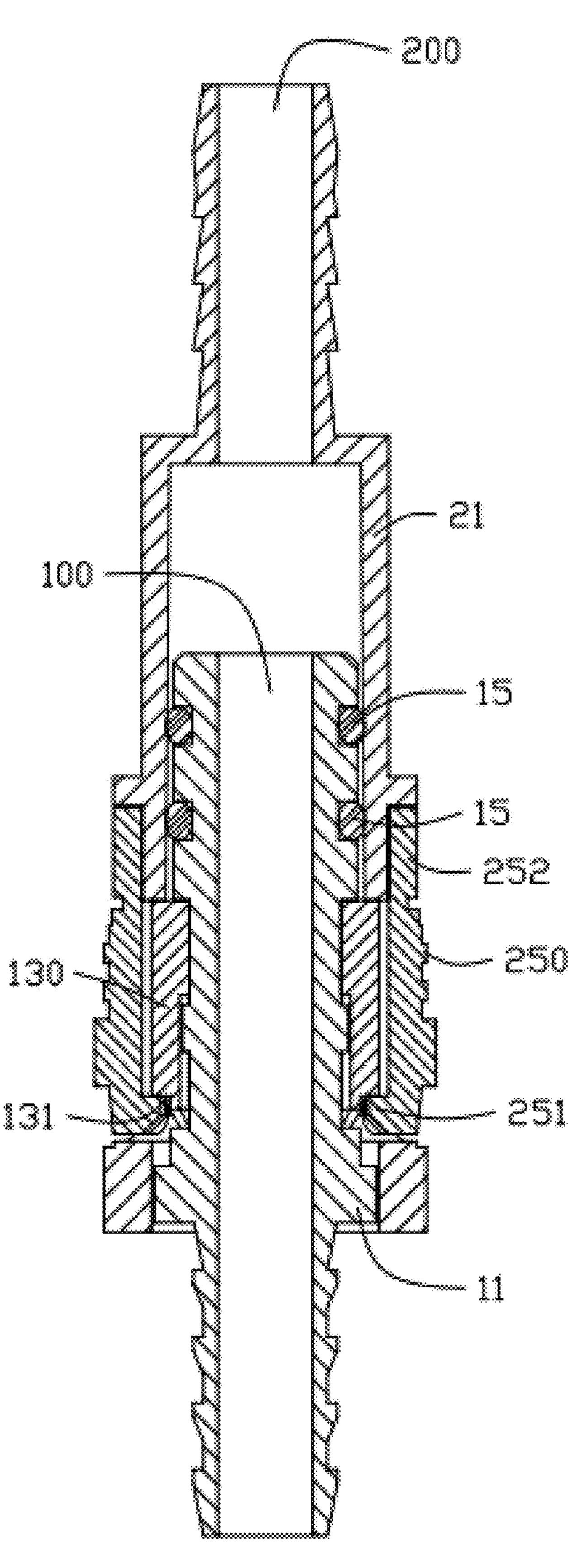

Optionally, as shown in FIGS. 5 and 6, the first connecting structure 13 comprises the coupling portions 130 and limiting portions 131 connected to the coupling portions 130, and an end portion of each of the coupling portions 130 recesses inward (i.e., toward the direction of a central axis of the first coupling portion 11) to form a corresponding one of the limiting portions 131. The second connecting structure 23 comprises the clamping holes 24 disposed on the inner wall 210 of the second coupling portion 21. After the first coupling portion 11 and the second coupling portion 21 are sleeved with each other, the clamping holes 24 are configured to accommodate the coupling portions 130, and the limiting portions 131 are attached to the inner wall 210 of the second coupling portion 21 to limit the first connecting structure 13 being completely accommodated in the clamping holes 24. The clamping holes penetrate through part of side walls of the second coupling portion 21.

It is understood that the clamping holes 24 may be configured as clamping grooves, as long as the clamping holes 24 being capable of accommodating the coupling portions 130 and realize the connection between the first connecting structure 13 and the second connecting structure 23.

Furthermore, one of the first joint 10 and the second joint 20 comprises operating structures 25. The operating structures 25 are configured to drive the first connecting structure 13 or the second connecting structure 23 to deform to separate the first connecting structure 13 from the second connecting structure 23.

For example, in one optional embodiment of the present disclosure, the first connecting structure 13 comprises coupling portions 130 connected to the first guide structure 12. The second connecting structure 23 comprises clamping holes 24 defined on the second coupling portion 21. The clamping holes 24 are configured to accommodate the coupling portions 130 when the second coupling portion 21 is sleeved on the first coupling portion 11. The operating structures 25 are disposed on the second coupling portion 21. The operating structures 25 are disposed corresponding to the clamping holes 24. The operating structures 25 are configured to drive the coupling portions 130 disposed in the clamping holes 24 to deform (i.e., to deform towards a direction of a central axis of the first coupling portion 11, that is, towards a direction of a central axis of the second coupling portion 21), so that the coupling portions 130 move from the clamping holes 24 to the second channel 200.

At this time, if the first coupling portion 11 is pulled in a direction away from the second coupling portion 21, the coupling portions 130 are not clamped in the clamping holes 24, then the first coupling portion 11 and the second coupling portion 21 are separated from each other. It should be noted that compared with the clamping grooves, the locking holes 24 are more convenient for the operating structures 25 to drive the coupling portions 130 clamped in the clamping holes 24.

Furthermore, in one optional embodiment of the present disclosure, the operating structures 25 comprise pressing portions 250 and protruding portions 251. Each of the protruding portions 251 is disposed on an inner side of a corresponding one of the pressing portions 250, and each of the protruding portions 251 at least partially extends into a corresponding one of the clamping holes 24. The pressing portions 250 deform under acting forces. When the second coupling portion 21 is sleeved on the first coupling portion 11 and when the coupling portions 130 reach positions of the clamping holes 24, the coupling portions 130 compress the protruding portions to drive the pressing portions 250 to deform outward, so that the coupling portions 130 are respectively clamped into the clamping holes 24. When outer walls of the pressing portions 250 are under the acting forces, inner sides of the pressing portions 250 deform to drive the protruding portions 251 to compress the coupling portions 130. The protruding portions 251 compress the coupling portions 130 to drive the coupling portions to deform inwards, so that the coupling portions respectively retract from the clamping holes 24 into the second channel 200. At this time, if the first coupling portion 11 is pulled in a direction away from the second coupling portion 21, the first coupling portion 11 and the second coupling portion 21 are separated from each other and are allowed to be detached when the clamping holes 24 no longer accommodate and clamp the coupling portions 130. It is understood that a top portion of each of the protruding portions 251 is configured as a spherical surface or an arc surface, etc., which not only simplifies a processing technology, but also avoids a jamming phenomenon.

At least one operating structure is provided. In order to facilitate the operator to hold and operate the at least one operating structure with two fingers, two operating structures 25 are provided. Each of the operating structures 25 is located between each two adjacent guide plates 220. Each of the pressing portions 250 and each of the protruding portions 251 are located at one end of a corresponding guide groove 2200 and face a corresponding one of the clamping holes 24, so that after each of the guide pieces 120 slides through the corresponding guide groove 2200, each of the guide pieces 120 faces a corresponding one of the coupling portions 130 clamped into a corresponding one of the clamping holes 24. Therefore, the two operating structures are able to compress the coupling portion 130 when receiving the external forces. Optionally, the two operating structures 25 are disposed opposite to each other, which is convenient for the operator to hold and operate with a thumb and an index finger.

Optionally, the second joint 20 further comprises a blocking structure 26 disposed on the second coupling portion 21. The blocking structure 26 is disposed on an inner wall of the second channel 200 and extends to positions of the clamping holes 24, and the blocking structure 26 is configured to block the outer walls of the pressing portions 250 from deforming under the acting forces and going deep into the second channel 200.

Furthermore, the operating structures 25 further comprise a second rotating structure 252 sleeved on the second coupling portion 21. The second rotating structure is a second sleeving ring. The pressing portions 250 extend from the second sleeving ring 252 toward the first coupling portion 11, and each of the protruding portions 251 is disposed adjacent to one end of a corresponding one of the pressing portions 250.

The pressing portions 250, the protruding portions 251, and the second sleeving ring 252 may be manufactured separately and then assembled and fixed into a whole, or pressing portions 250, the protruding portions 251, and the second sleeving ring 252 may be directly manufactured into a whole. For example, in the embodiment of the present disclosure, the pressing portions 250, the protruding portions 251, and the second sleeving ring 252 are manufactured into a whole. That is, the pressing portions 250, the protruding portions 251, and the second sleeving ring 252 are integrally disposed.

The second rotating structure 252 is a second O-shaped ring or a second C-shaped ring. When the second rotating structure 252 is the second C-shaped ring, the second rotating structure 252 is deformable under the external forces to make an opening thereof larger, so that it is convenient for the operator to remove the second rotating structure 252 from the second coupling portion 21. In this way, when the pressing portions 250 and/or the protruding portions 251 are damaged, the second rotating structure 252 is allowed to be removed and replaced, and an operation process is simple and quick.

It is understood that in order to ensure sealing performance of the joint assembly after assembly and to prevent leakage of the joint assembly, sealing rings 15 are sleeved on the first coupling portion 11. In addition to a sealing function, the sealing rings 15 further buffers vibration and impact, thereby extending the service life of the joint assembly. When temperature changes and causes the joint assembly to expand and contract, the sealing rings 15 further compensate for a change in a sleeve gap caused by a deformation of the joint assembly, thereby further improving the sealing performance.

One embodiment of the present disclosure further provides a faucet. The faucet comprises the joint assembly as described above, which is not described in detail herein.

The above embodiments of the present disclosure provide a detailed illustration to the joint assembly and the faucet. In the present disclosure, specific embodiments are applied to illustrate the principles and implementations of the present disclosure. The above description of the embodiments is only used to better understand methods and core ideas of the present disclosure. Meanwhile, according to the ideas of the present disclosure, changes are made in the specific implementations and the application scope by those skilled in the art. Therefore, the contents of the specification should not be regarded as a limitation of the present disclosure.

What is claimed is:

1. A joint assembly, comprising:

a first joint; and a second joint;

wherein the first joint defines a first channel penetrating through the first joint in a length direction thereof, and the first joint comprises a first coupling portion, a first connecting structure, and a first guide structure; wherein the first connecting structure and the first guide structure are disposed on the first coupling portion, the first guide structure comprises at least two guide pieces, the at least two guide pieces are disposed around the first joint in the length direction of the first joint, and the at least two guide pieces are spaced apart from each other and are disposed on an outer wall of the first coupling portion;

wherein each of the guide pieces comprises two first guide walls, and the two first guide walls of each of the guide pieces intersect at one end of each of the guide pieces to form a first guide tip of each of the guide pieces;

wherein the second joint comprises a second channel penetrating through the second joint in a length direction thereof, and the second joint comprises a second coupling portion, a second connecting structure, and a second guide structure, wherein the second connecting structure and the second guide structure are disposed on the second coupling portion;

wherein the second guide structure comprises at least two guide plates, the at least two guide plates are disposed around the second joint in the length direction of the second joint, the at least two guide plates are spaced apart from each other and are disposed on an inner wall of the second coupling portion, a guide groove is defined between each two adjacent guide plates of the at least two guide plates, and each guide groove is corresponding to a corresponding one of the at least two guide pieces;

wherein each of the guide plates comprises two second guide walls, and two second guide walls of each of the guide plates intersect at one end of each of the guide plates to form a second guide tip of each of the guide plates;

wherein the first guide structure and the second guide structure guide the first coupling portion and the second coupling portion to rotate relative to each other in a sleeving process, so as to limit the movement direction of the first coupling portion and the movement direction of the second coupling portion, so that the first connecting structure is aligned with the second connecting structure;

wherein when the second coupling portion is sleeved on the first coupling portion, each of the guide pieces is accommodated in a corresponding guide groove and is slidable in the corresponding guide groove, each first guide tip faces the second coupling portion, each second guide tip faces the first coupling portion, and the two first guide walls of each of the guide pieces are disposed in the corresponding guide groove and are slidable relative to at least one of two adjacent guide plates;

wherein when the second coupling portion is sleeved on the first coupling portion, the first connecting structure is connected to the second connecting structure to fix a position of the first coupling portion relative to the second coupling portion.

2. The joint assembly according to claim 1, wherein when the second coupling portion is sleeved on the first coupling portion, the first connecting structure is engaged with the second connecting structure to fix a position of the first coupling portion relative to the second coupling portion.

3. The joint assembly according to claim 2, wherein the first guide structure is connected to the first connecting structure, and the first guide structure and the first connecting structure are rotatable on an outer wall of the first coupling portion.

4. The joint assembly according to claim 3, wherein the first joint further comprises a first rotating structure, the first rotating structure is disposed on the outer wall of the first coupling portion, and the first rotating structure is rotatable on the outer wall of the first coupling portion;

wherein the first guide structure and the first connecting structure are disposed on the first rotating structure, and the first guide structure is closer to a free end of the first coupling portion than the first connecting structure.

5. The joint assembly according to claim 4, wherein the first rotating structure is a first sleeving ring sleeved on the outer wall of the first coupling portion, the first connecting structure extends from the first sleeving ring toward the second coupling portion, and the first guide structure extends from one end of the first connecting structure toward the second coupling portion.

6. The joint assembly according to claim 5, wherein the first sleeving ring is a first C-shaped ring.

7. The joint assembly according to claim 5, wherein the first guide structure, the first connecting structure, and the first rotating structure are integrally disposed.

8. The joint assembly according to claim 1, wherein the two first guide walls and the first guide tip in each of the guide pieces form a first isosceles triangle shaped vertex structure;

wherein the two second guide walls and the second guide tip in each of the guide plates form a second isosceles triangle shaped vertex structure.

9. The joint assembly according to claim 1, wherein one of the first joint and the second joint comprises operating structures, the operating structures are configured to drive the first connecting structure or the second connecting structure to deform to separate the first connecting structure from the second connecting structure.

10. The joint assembly according to claim 9, wherein a first rotating structure comprises coupling portions connected to the first guide structure, the second connecting structure comprises clamping holes defined on the second coupling portion, and the clamping holes are configured to accommodate the coupling portions when the second coupling portion is sleeved on the first coupling portion;

wherein the operating structures are disposed on the second coupling portion, the operating structures are disposed corresponding to the clamping holes; and the operating structures are configured to drive the coupling portions disposed in the clamping holes to deform, so that the coupling portions move from the clamping holes to the second channel.

11. The joint assembly according to claim 10, wherein the operating structures comprise pressing portions and protruding portions, each of the protruding portions is disposed on an inner side of a corresponding one of the pressing portions, and each of the protruding portions at least partially extends into a corresponding one of the clamping holes;

wherein the pressing portions deform under acting forces;

wherein when the second coupling portion is sleeved on the first coupling portion, the coupling portions drive the pressing portions to deform outward through the protruding portions, so that the coupling portions are respectively clamped into the clamping holes;

wherein when outer walls of the pressing portions are under the acting forces, the pressing portions drive the coupling portions to deform through the protruding portions, so that the coupling portions respectively retract from the clamping holes into the second channel.

12. The joint assembly according to claim 11, wherein the second joint further comprises a blocking structure disposed on the second coupling portion, the blocking structure is disposed on an inner wall of the second channel and extends to positions of the clamping holes, and the blocking structure is configured to block the outer walls of the pressing portions from deforming under the acting forces and going deep into the second channel.

13. The joint assembly according to claim 11, wherein the operating structures comprise two operating structures, each of the operating structures is located between each two adjacent guide plates, each of the pressing portions and each of the protruding portions are located at one end of a corresponding guide groove and face a corresponding one of the clamping holes, so that after each of the guide pieces slides through the corresponding guide groove, each of the guide pieces faces a corresponding one of the coupling portions clamped into a corresponding one of the clamping holes.

14. The joint assembly according to claim 13, wherein the operating structures share a second rotating structure sleeved on the second coupling portion, the second rotating structure is a second sleeving ring, the second sleeving ring is a second C-shaped ring, the pressing portions extend from the second sleeving ring toward the first coupling portion, and each of the protruding portions is disposed adjacent to one end of a corresponding one of the pressing portions.

15. The joint assembly according to claim 11, wherein a top end of each of the protruding portions is an arc surface.

16. A faucet, comprising the joint assembly according to claim 1.

* * * * *